Dec. 14, 1948.   N. PLANK   2,456,566

REVERSE-FLOW-BY-PASS VALVE

Filed Nov. 18, 1946

Inventor:   Norris Plank
By His Attorney

Patented Dec. 14, 1948

2,456,566

UNITED STATES PATENT OFFICE 2,456,566

REVERSE FLOW BY-PASS VALVE

Norris Plank, East Chicago, Ind., assignor to Shell Development Company, San Francisco, Calif., a corporation of Delaware Application November 18, 1946, Serial No. 710,570

3 Claims. (Cl. 251—118)

1

This invention relates to an automatic reverse flow system for the transportation of liquids, and pertains more particularly to a reverse flow by-pass valve structure used in said system.

The system of the present invention is especially applicable to pipe line systems connecting a storage or terminal tank to a main pipe line where the liquid is transported between the pipe line and said tank by a single delivery line having attached to it, for the purpose of transporting liquid from the storage tank to main pipe line, a pump which must be by-passed when liquid is delivered from main pipe line to storage tank.

For this purpose, the pump in communication with the tank is usually by-passed by means of a by-pass line and a suitable valve arrangement in order to protect said pump, since certain types of pumps are damaged when run backwards by the force of the liquid being delivered. Other pumps are by-passed because they cannot be run backwards and thus prevent the liquid from entering the tank.

The above mentioned pump by-pass line may have installed in it any desired type of manually operated or remote control valve. Since remote control valves and their means of operation often necessitate a considerable amount of inspection and maintenance, and since the use of manually operated valves is costly in requiring the use of operators, it is desirable, to provide a flow system free of all elements that are not conducive to economical operations.

It is therefore a primary object of this invention to provide a reverse flow by-pass system whereby a pump used to deliver a liquid from a tank to a pipe line is automatically by-passed when it is desired to reverse the direction of flow and to deliver the liquid from the pipe line to said tank.

It is a further object of this invention to provide an automatic, positive-action valve structure of simple construction which required a minimum of maintenance and is self-operating, the pressure of the liquid flowing into the valve causing said valve to open in the proper direction.

Another object of this invention is to provide a valve structure that can receive a liquid flow from either of two different directions and operates automatically to by-pass a pump. In receiving the liquid into the tank from a main pipe line, a single delivery line and a reverse flow by-pass valve and a short pump by-pass line are utilized. In pumping the liquid from the tank to the main pipe line, it is necessary to use a pump, a reverse flow by-pass valve, a short by-pass line with a check valve in it, and said single delivery line.

Other objects of this invention will appear from the following description taken with reference to the attached drawings, wherein.

Figure 1:
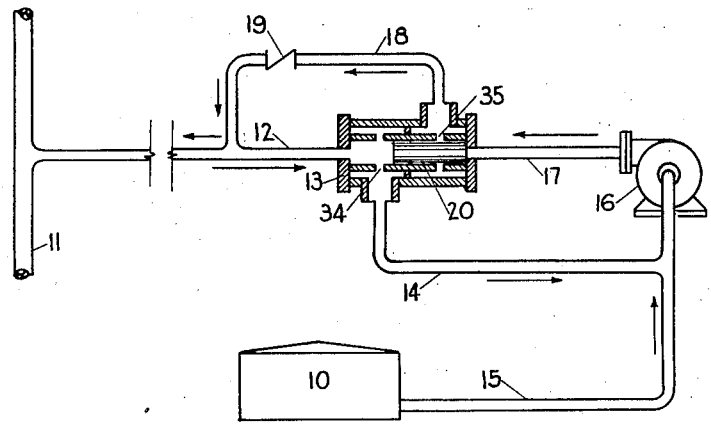
Fig. 1 is a schematic diagram of a system embodying this invention.

As shown in Fig. 1, the system of the present reverse flow by-pass valve structure may comprise a main pipe line 11, a tank 10 and a pump 16. The pipe line 11 is connected to the tank 10 and pump 16 by means of a conduit or single delivery line 12, the present automatic valve 13, the pump by-pass line 14, and branch lines 15 and 17 forming extensions of the line 12. When a delivery of liquid is made from the main pipe line 11, the check valve 19 prevents backflow through auxiliary line 18, the pressure of the liquid forces the movable piston 20 within the valve 13 to the right as shown, thus closing conduit 17, and preventing backflow through the terminal pump 16. At the same time, the piston closes ports 35 to auxiliary line 18 while opening ports 34, so that the liquid flows through pump by-pass line 14, conduit 15 and thence into the storage tank 10, thereby effectively by-passing pump 16.

When, in the course of operations, it is desired to exhaust the tank liquid back into the main pipe line 11, the pump 16 is started drawing liquid from tank 10 through conduit 15. The pump discharged the liquid through conduit 17 against the movable piston 20 of the valve 13, and the pump discharge pressure forces the piston 20 to the left, closing port 34 and then opening port 35, thus permitting the liquid to flow through ports 35, auxiliary line 18, check valve 19 and into main pipe line 11. As long as the flow of liquid is in that direction, the piston 20 remains on the left side of the valve (as shown in Fig. 2), effectively closing ports 34 on that side of the valve and thus preventing the liquid from returning to storage tank 10 through pump by-pass line 14 and conduit 15.

Figure 2:
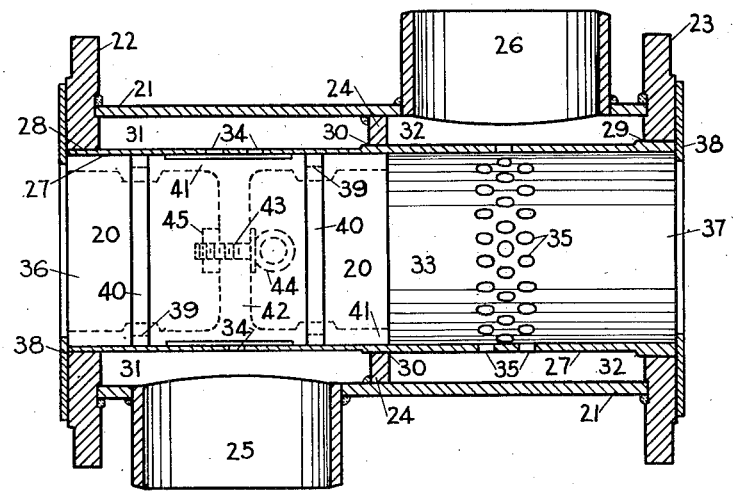
Fig. 2 is a sectional view of the reverse flow by-pass valve.

The reverse flow by-pass valve as illustrated in Fig. 2 comprises an outer valve casing 21 to which are attached the flanges 22 and 23 and an intermediate ring 24. Ports 25 and 26 lead through casing 21 at opposite ends of said casing and are respectively connected to lines 14 and 18. The inner valve casing 27 is concentrically disposed within the outer casing 21 in close-fitting contact with the inner surfaces of flanges 28 and 29 and ring 30, forming the annular chambers 31 and 32 which are in communication with ports 25 and 26 respectively. The inner valve casing 27 forms a piston chamber 33.

Port 25 and annular chamber 31 are in communication with piston chamber 33 by port means such, for example, as shown by circumferential rows of holes or perforations 34 in the wall of inner casing 27. Similar perforations 35 are shown connecting the piston chamber 33 to annular chamber 32 and port 26. The ends of the piston chamber, when open, form ports 36 and 37 which are connected to conduits 12 and 17 respectively. Gaskets 38 of soft metal or other material, having an opening slightly smaller than the diameter of the piston are located between flanges 22 and 23 and the adjacent conduit flanges. These gaskets limit the horizontal travel of the piston 20.

The movable piston 20, a separate unit which can travel back and forth in the perforate piston chamber 33, may be of any desired form. For example, it may be made as a solid plastic or wooden plug, as a hollow metallic cylinder, etc. A preferred form is shown in Fig. 2 which has two circumferential grooves 39 in the outer surface to hold the piston rings 40 which form the seal between the piston and the side walls of the piston chamber. The piston 20 has side walls 41 and a partition 42, said partition acting as the piston face when fluid pressure is applied to move said piston. The piston has sufficient length to completely cover both perforation 34 and perforation 35 when piston is in the exact center of valve 13. A hole 43 in the center of the partition 42 contains an eye-bolt 44 which is secured by nut 45, said eye-bolt being used to facilitate the removal of the piston 20 from the perforate piston chamber 33 during maintenance of the valve.

The reverse flow by-pass valve 13, as illustrated in Fig. 2, shows the unit in the position taken when a liquid is being pumped from storage tank 10 to the main pipe line 11. The discharge pressure of the pump has forced the piston 20 horizontally in piston chamber 33 to the position shown. The liquid now freely flows through port 37, piston chamber 33, perforations 35, annular chamber 32, port 26, auxiliary line 18 and check valve 19 into the main pipe line 11. With piston 20 in this position the other set of perforations 34 in the wall of piston chamber 33 is closed thus effectively closing ports 25 and 36 thus preventing the liquid being pumped from returning to tank 10 through conduits 12 and 14.

When it is desired to reverse the flow and to fill the tank 10 from the pipe line 11, the pump 16 is stopped and the main pipe line pressure forces the piston 20 in piston chamber 33 to the position shown in Fig. 1. The liquid is now forced, by the line pressure, through port 36, piston chamber 33, perforations 34, annular chamber 31, port 25, pump by-pass line 14, conduit 15 and thence into said tank 10, the terminal pump 16 being effectively by-passed.

I claim as my invention:

1. A reverse flow by-pass valve for pipe lines comprising an inner tubular member open at both ends, an elongated outer housing member radially spaced from the inner tubular member, transverse flange means defining first and second closed chambers between said members, first aperture means through the inner tubular member opening to the first chamber, second aperture means through the inner tubular member opening to the second chamber, first radial port means through the outer member opening to the first chamber, second radial port means through the outer member opening to the second chamber, and a pressure responsive piston member slidably movable within the inner tubular member for selectively closing one of said aperture means, said by-pass valve being connectible at either end into a pipe-line, whereby the reciprocation of said pressure-responsive piston is limited to the axial length of said inner tubular member by the abutment of said valve with said pipe line.

2. A reverse flow by-pass valve for pipe lines comprising an inner tubular member open at both ends, an elongated tubular outer housing member radially spaced from the inner tubular member, transverse flange means defining first and second closed chambers between said members, a first set of perforations through the inner tubular member opening to the first chamber, a second set of perforations through the inner tubular member opening to the second chamber, first radial port means through the outer member opening to the first chamber, second radial port means through the outer member opening to the second chamber, and a pressure responsive cylindrical piston member slidably movable within the inner tubular member for selectively closing one of said sets of perforations, said by-pass valve being connectable at either end into a pipe-line, whereby the reciprocation of said pressure-responsive piston is limited to the axial length of said inner tubular member by the abutment of said valve with said pipe line.

3. A reverse flow by-pass valve for pipe lines comprising an inner tubular member open at both ends, an elongated tubular outer housing member radially spaced from the inner tubular member, transverse flange means defining first and second closed chambers between said members, a first set of perforations through the inner tubular member opening to the first chamber, a second set of perforations through the inner tubular member opening to the second chamber, first radial port means through the outer member opening to the first chamber, second radial port means through the outer member opening to the second chamber, a pressure responsive cylindrical piston member slidably movable within the inner tubular member for selectively closing one of said sets of perforations, and means at each end of inner tubular member to limit the travel of the piston.

NORRIS PLANK.

REFERENCES CITED

The following references are of record in the file of this patent:

UNITED STATES PATENTS

| Number | Name | Date |
| --- | --- | --- |
| 1,202,067 | Hulslander | Oct. 24, 1916 |
| 1,410,289 | Farmer | Mar. 21, 1922 |
| 1,619,474 | Hubbard | Mar. 1, 1927 |
| 1,887,585 | Down | Nov. 15, 1932 |
| 1,995,815 | Purdum | Mar. 26, 1935 |
| 2,311,851 | McClure | Feb. 23, 1943 |